May 26, 1959 R. E. HEBERT 2,888,140
FILTER BAFFLES
Filed Aug. 8, 1958 2 Sheets-Sheet 1
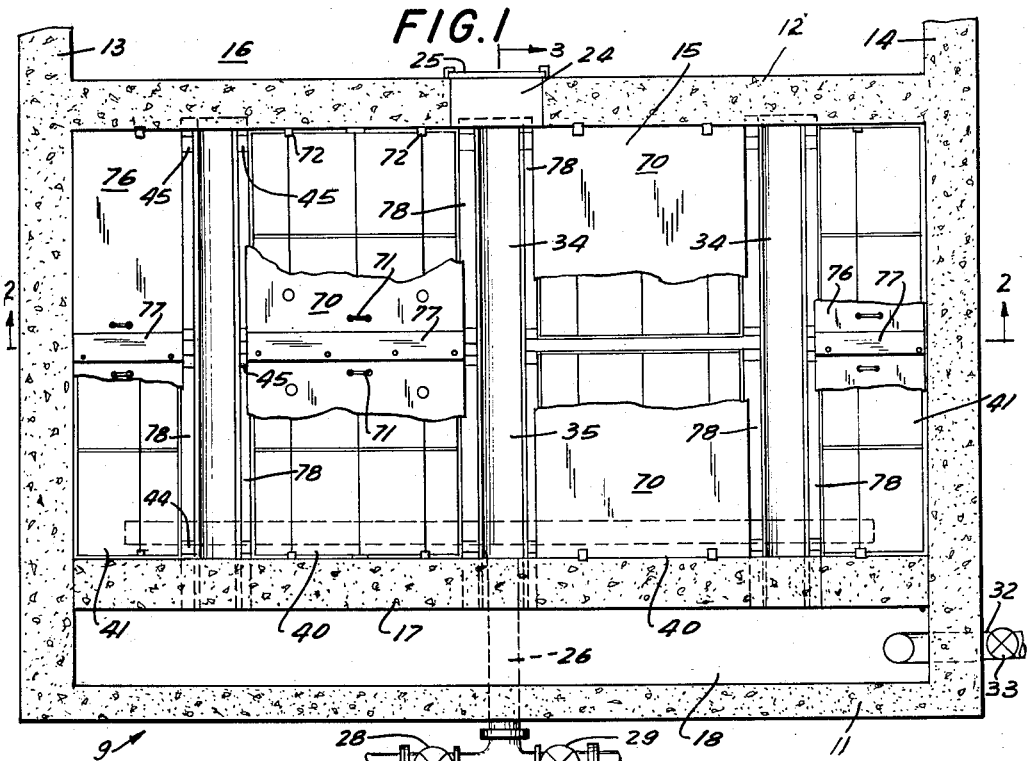
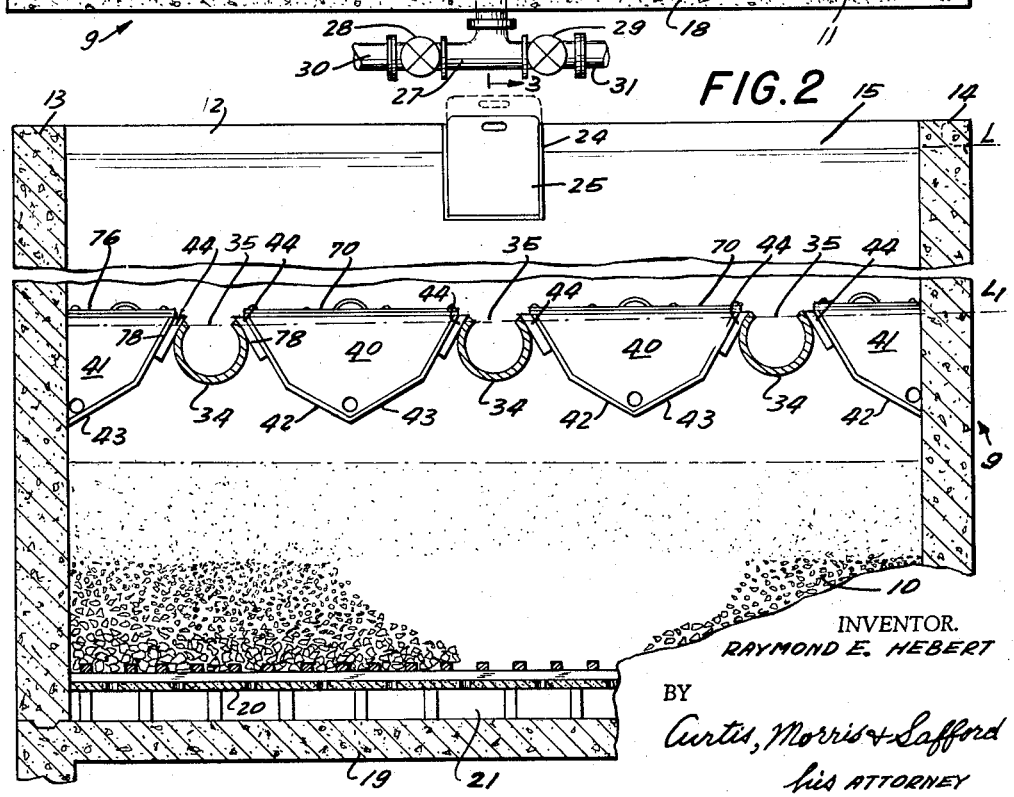
INVENTOR.
RAYMOND E. HEBERT
BY
Curtis, Morris & Safford
his ATTORNEY May 26, 1959 R. E. HEBERT 2,888,140
FILTER BAFFLES
Filed Aug. 8, 1958 2 Sheets-Sheet 2
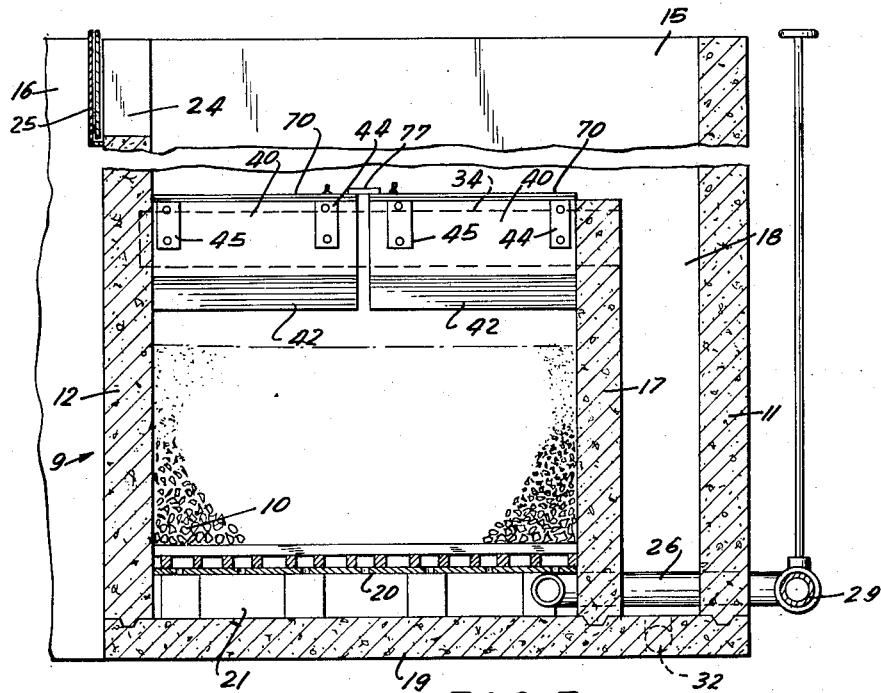
FIG.3
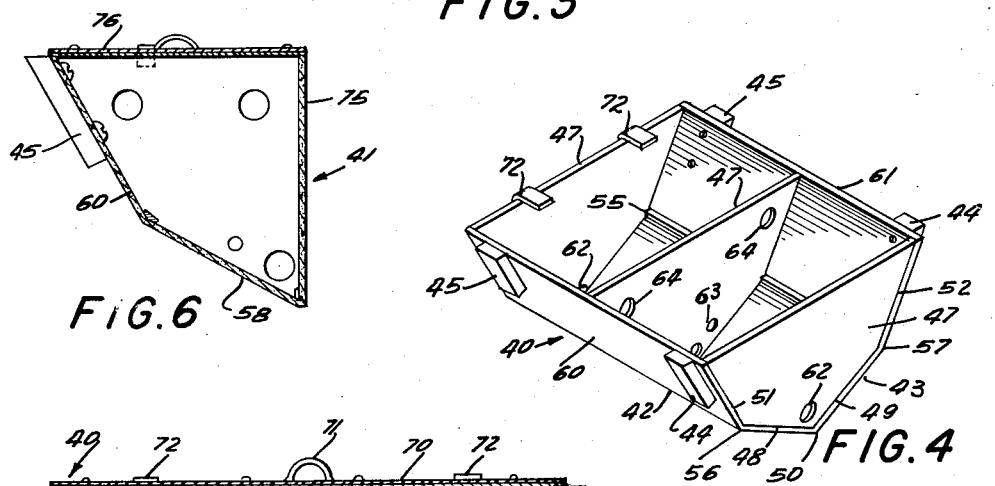
FIG.6
FIG.4
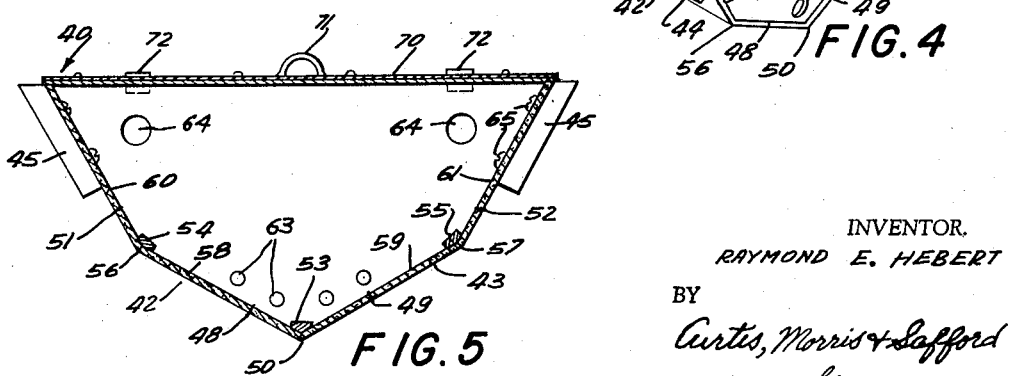
FIG.5
INVENTOR.
RAYMOND E. HEBERT
BY
Curtis, Morris & Safford
his ATTORNEY

# United States Patent Office 2,888,140
Patented May 26, 1959

2,888,140

FILTER BAFFLES

Raymond E. Hebert, Rochester, N.Y.

Application August 8, 1958, Serial No. 754,059

10 Claims. (Cl. 210—275)

The present invention relates to filters of the type used in filtering large quantities of water in municipal water systems or other liquids. Most filters used for this purpose are of the "rapid-sand" gravity type and the invention will be illustrated and described as applied to such a "rapid-sand" filter. However, it is to be understood that the invention also is applicable to other types of commercial filters such as porous plate filters and those using crushed anthracite coal or other granular particles as a filtering medium.

Rapid-sand filters comprise a structure for enclosing a filter bed through which the liquid to be filtered flows by gravity. The filter bed is supported on a foraminous floor and comprises graded particles of gravel and sand which decrease in size from the floor to the top of the bed where a very fine grade of sand is used. As the liquid passes through the filter bed by gravity, solid particles which cannot pass between the grains of sand are filtered therefrom at the top of the filter bed. After a period of use, the accumulation of filtrates tends to clog the filter which decreases the quantity of water passing therethrough and also impairs the filtering properties of the sand.

The filter beds of such rapid-sand filters are periodically cleaned by back-washing to remove the filtered residue. This is accomplished by interrupting the filtering operation and forcing water upwardly through the filter bed at a relatively rapid rate. The wash water boils through the sand of the filter bed which vigorously agitates the sand particles and flushes the filtered solids therefrom. During such washing, the velocity of the wash water flowing between the interstices of the sand particles has sufficient velocity to displace and separate the particles of sand and filtered solids and causes the filter bed to expand. However, after the wash water leaves the area of the sand in the expanded filter bed, the cross-sectional area of the path of flow increases, due to the lesser number of sand particles in its path which, in turn, decreases the velocity of the wash water for the same rate of flow. Thus, the particles of sand settle out of the water. The filtered solids have a lower density than the sand particles and are intended to be carried away with the wash water, but due to the decrease in velocity they also tend to settle out of the water and return to the filter bed.

This problem has been recognized and others have proposed restrictive baffles above the filter bed to maintain the wash water at a velocity sufficient to maintain the filtered solids in suspension after removal from the sand. However, such restrictive baffles, as previously proposed, are usually built as a part of the filter unit, interfere with easy access to the filter bed, are difficult to clean and expensive to install and maintain.

One of the objects of the present invention is to provide a rapid-sand filter of the type indicated with restrictive baffles of improved construction for maintaining filtered solids in suspension in the wash water.

Another object is to provide restrictive baffles which are removably supported in position above the filter bed by the drain troughs with which they are used to facilitate cleaning and permit easy access to the filter bed.

Another object is to provide restrictive baffles in a filter of the type indicated which provide an extensive flat surface above the filter bed onto which dirt and other solids will settle from the water to be filtered before it enters the filter bed.

Still another object is to provide restrictive baffles of the type indicated which are of simple and compact construction, economical to manufacture and maintain and reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

Figure 1 is a plan view of a rapid-sand filter incorporating the restrictive baffles of the present invention and showing a plurality of the baffles mounted in adjacent side by side relationship in the filter unit;

Figure 2 is a sectional view taken on line 2—2 of Figure 1 and showing the upwardly inclined sides of adjacent baffles which provide upwardly converging paths to the drain troughs therebetween;

Figure 3 is a sectional view taken on line 3—3 of Figure 1 to show the spillway header into which the wash water and sediment drain during a back-washing operation;

Figure 4 is a perspective view of one of the removable baffles mounted between adjacent drain troughs;

Figure 5 is a sectional view through the baffle illustrated in Figure 4 to show its construction; and Figure 6 is a sectional view of a baffle mounted between a side wall of the filter unit and a drain trough.

Referring now to the drawings, the present invention is shown applied to a filter unit 9 of the rapid-sand type having a structure for enclosing a filter bed 10. The filter unit 9 may be like that illustrated and described in the United States Letters Patent to Thomas M. Riddick, 2,745,553, issued May 15, 1956. However, for the purposes of describing and illustrating the invention, a simplified filter unit 9 is shown in the drawings. Suffice it to state herein that the enclosing structure of the filter unit 9 has opposite side walls 11 and 12 and end walls 13 and 14 to form a filter chamber 15, see Figure 1. The end walls 13 and 14 project beyond the side wall 11 to provide a reservoir 16 for water to be filtered. A wall 17 extends between the end walls 13 and 14 in spaced relation to side wall 11 to provide a draining spillway 18 in the chamber 15.

Filter unit 9 has a bottom wall 19 and a foraminous false bottom 20 supported thereon in spaced relation thereto to provide an outlet opening 21 therebetween. As shown in Figure 2, a filter bed 10 is supported on the foraminous false bottom 20 and comprises graded gravel and sand which decreases in size from the bottom toward the top so that the top portion of the filter bed is composed of fine sand.

As shown in Figure 1, the side wall 12 of the filter unit 9 has a gate 24 through which water is to be filtered flows into the filter chamber 15 from the reservoir 16. Gate 24 is controlled by gate valve 25 which may be slid upwardly to the position illustrated in Figure 2 to supply water to the filter chamber 15 or slid downwardly to close the gate. Filtered water flows from the filter bed 10 through the foraminous false bottom 20 into the outlet opening 21 and then through a discharge pipe 26 for delivery to a storage vessel or other place where it is to be used. A T-fitting 27 is illustrated on the discharge pipe 26 and has valves 28 and 29 for opening and closing the branch pipes 30 and 31. For example, branch pipe 30 is adapted to deliver the filtered water to a storage vessel or place where it is to be used when the valve 28 is open; and branch 31 is adapted to supply back-washing water to clean the filter bed 10 when the valve 29 is open and the valve 28 is closed. Similarly, a drain pipe 32 is provided in the bottom of the spillway 18 for delivering wash water and filtrates removed from the filter bed to any place of disposal, such as a sewer, and the drain pipe 32 is controlled by a valve 33.

The filter unit 9 also includes conventional drain troughs 34 extending across the filter chamber 15 above the filter bed 10. As shown in Figure 1, the drain troughs 34 are arranged at the same level and spaced equal distances from each other and from the end walls 13 and 14 a distance equal to one half the distance between each other. As shown in Figure 2, the drain troughs 34 are of generally circular form in cross-section and have a longitudinally extending opening 35 in the top thereof. Each drain trough 34 is supported by and extends through the wall 17 to discharge wash water into the spillway 18. As will be observed by reference to Figure 3, the wall 17 extends only a slight distance above the common level of the drain troughs 34 to provide a weir over which the wash water may spill if not carried away by the drain troughs 34. As thus far described, the filter unit 9 may be considered as a conventional construction used prior to the present invention.

In accordance with the present invention, a series of restrictive baffles 40 and 41 are positioned in the filter chamber 15 between the top of the filter bed 10 and the plurality of drain troughs 34. As shown in Figures 1 and 2, the baffle elements 40 are positioned between and supported on the adjacent drain troughs 34, while the baffle elements 41 are supported between the end walls 13 and 14 and adjacent drain troughs 34. The sides 42 and 43 of adjacent baffle elements 40 and 41 are inclined outwardly and upwardly toward the edges of the drain troughs 34 and are held spaced therefrom by spacer plates 44 and 45 at each end to provide converging paths of flow from the top of the filter bed 10 to the edges of the drain troughs 34.

The baffles 40 and 41 merely rest on the edges of adjacent troughs 34 so that they may be easily and quickly applied to or removed from the filter unit 9. As shown in Figures 4 and 5, each baffle element 40 is of a hollow, lightweight construction to adapt it to be lifted into and out of the filter chamber 15. Baffle elements 40 comprise a bulkhead 47 at each end and a similar bulkhead 47 therebetween. Each bulkhead 47 has lower edges 48 and 49 inclined outwardly and upwardly from a central apex 50 at an angle of approximately 30° from the horizontal and upper edges 51 and 52 forming a continuation of the lower edges which incline outwardly and upwardly at an angle of approximately 60° with the horizontal. It will be understood that the height of the bulkheads 47 and the angular relation of the side edges may be varied to provide the velocity required for a particular design of filter unit 9. The bulkheads 47 are connected by stringers 53, 54 and 55 which extend longitudinally at the lower central apex 50 and the corners 56 and 57 between the angular edges 48, 51 and 49, 52 thereof. Panels 58 and 59 are attached to the lower edges 48 and 49 of bulkheads 47 at opposite sides of the central apex 50 by screws extending through the panel into the edges of the bulkheads and the stringers 53, 54 and 55. Similarly, panels 60 and 61 are attached to the upper inclined edges 51 and 52 at opposite sides of the bulkheads 47. Thus, the panels 58, 60 form one inclined side 42 of baffle 40 and the panels 59, 61 form the other inclined side 43. The bulkheads 47 and the panels 58, 59 and 60, 61 may be composed of any suitable material which is resistant to corrosion and rot. One suitable material is a synthetic board formed of asbestos and Portland cement known as "Transite" but other materials can be used. The spacer plates 44 and 45 also may be composed of "Transite" and are attached to the opposite panels 48 adjacent each end by means of screws 65, as shown in Figure 5.

The bulkheads 47 at each end of the baffle unit 40 are provided with holes 62 adjacent the central lower apex 50 to permit water to enter the hollow baffles and thereby prevent them from floating. The central bulkhead 47 of each baffle 40 is provided with a plurality of small holes 63 adjacent the inclined edges 48 and 49 and a pair of larger holes 64 adjacent the top to permit water to flow into each end of the baffle and between chambers at opposite sides of the central bulkhead.

Each baffle 40 has a flat removable cover 70 which also may be made of "Transite" and overlies the upper edges of the bulkheads 47 and panels 60 and 61. The flat covers 70 have a handle 71 to adapt them to be removed manually. To facilitate positioning the covers 70 on the baffles 40, spaced clips 72 are mounted on the side of one end bulkhead 47 adjacent the top thereof which overhang the upper edge thereof. Thus, the cover 70 may be lowered onto the top of the baffle 40 while held by the handle 71 and then slid to engage one edge under the clips 72 after which the handle is released.

The baffles 41 are of the same general construction as the baffles 40 previously described except that they have inclined panels 58 and 60 at one side only. The opposite side is formed by a vertical wall 75 adapted to abut the end walls 13 or 14 of the filter unit 9. As illustrated in Figure 2, the inclined side panel 60 of the baffle 41 also is provided with spacer plates 44 and 45 to hold the inclined side 43 in spaced relation to the edge of the drain troughs 34 on which it is mounted and is held in its proper position by the engagement of the vertical wall 75 with the end wall 13 or 14 of the filter unit.

As illustrated in Figure 1, a plurality of the baffles 40 are mounted in end to end relationship between each pair of adjacent drain troughs 34 to fill the entire space between the walls 12 and 17 of the filter unit; and corresponding baffles 41 are mounted in end to end relationship between the end walls 13 and 14 of the filter unit 9 and the adjacent drain troughs 34. With the baffles 40 and 41 so mounted in the filter unit with the covers 70 and 76 in place thereon, they provide an extensive flat surface above the filter bed 10 onto which solid materials may settle from the water to be filtered before the water enters the filter bed 10. To even further extend the flat surface of the covers 70 and 76, each cover has a strip 77 mounted on the top thereof adjacent one edge which projects therefrom to overlie the opposite edge of an adjacent cover of the next adjacent baffle 40 or 41. Thus, the baffles 40 and 41 are immersed during a filtering operation and the water must flow through the spaces 78 between the edges of the drain troughs 34 and baffles 40 and 41 to enter the filter bed 10. One form of the filter unit 9 and baffle construction having now been described in detail, the mode of operation is explained below.

To initiate a filtering operation the gate valve 25 is raised to permit water to be filtered to flow into the filter chamber 15 of the filter unit 9 from the reservoir 16. Valve 28 in the discharge pipe 30 is opened and valves 29 and 33 of the back-wash system are closed. The water to be filtered fills the chamber 15 to the level indicated by the line L above the baffles 40 and 41 and the filter bed 10. The water is in a relatively quiet state in the chamber 15 and the particles of dirt and other solids to be filtered tend to settle on the covers 70 and 76 of the baffle units. The water to be filtered flows slowly between the baffles 40, 41 and the drain troughs 34 toward the filter bed 10 and then flows through filter bed to the outlet opening 21 between the false bottom 20 and bottom wall 19 of the filter unit 10. During flow through the filter bed 10 the dirt and other solids are filtered from the water due to the small spacing or interstices between adjacent grains of the sand. The filtering operation is continued until the sand in the filter bed has become fouled and clogged with the filtered material.

The filter bed is back-washed by closing the gate valve 25 between the reservoir 16 and filter chamber 15, closing the valve 28 in the discharge line 30 for filtered water and opening the valves 29 and 33 of the back-wash system. The water then flows from the filter chamber 15 through the spillway 18 and drain pipe 32 to the level L' at the top of the drain troughs 34, as illustrated in Figure 2. Clean water then flows from the supply pipe 31 through the valve 29 and pipe 26 into the opening 21 between the false bottom 20 and bottom wall 19 of the filter unit. The water flows upwardly through the filter bed 10 and boils through the sand creating a considerable turbulence and movement of the particles of sand to loosen the filtered dirt and solids therefrom. Due to the relatively high velocity of the wash water as it passes between the grains of sand, the dirt and solid materials are held in suspension in the water. As the wash water continues its upward movement from the expanded filter bed, its velocity tends to decrease, due to the increase in the cross-sectional area of its path of movement, which permits the particles of sand to settle back while maintaining the removed dirt and solid particles of lighter density in suspension. At this point the inclined converging sides of adjacent baffles 40 and 41 produce a gradually converging restriction in the path of flow of the wash water, see Figure 2, which again progressively increases the velocity of the water to maintain the dirt and solids in suspension. The wash water with the dirt in suspension then flows into the drain troughs 34. The wash water and filtrates flow through the drain troughs 34 into the spillway 18 and from the spillway through drain pipe 32 to a place of disposal, such as a sewer.

The back-wash operation is continued until the filter bed has been thoroughly cleaned after which the top of the covers 70 and 76 are hosed to wash the dirt and solids thereon into the drain troughs 34 after which the drain troughs and spillway are thoroughly flushed. The filter unit is then ready for another filtering cycle which may be initiated by closing the valves 29 and 33 of the back-wash system and opening the gate valve 25 and outlet valve 28 of the filtering system.

It will now be observed that the present invention provides removable restrictive baffles of improved construction in a sand filter which facilitates cleaning and permits easy access to the filter bed. It will also be observed that the invention provides removable restrictive baffles adapted to be supported in position above the filter bed by the parts of a conventional filter unit. It also will be observed that the covers on the baffles provide an extensive flat surface above the filter bed on which dirt and other solids settle from the water to be filtered before it enters the filter bed. It will still further be observed that the present invention provides restrictive baffles of simple and compact construction which may be economically manufactured and maintained and which are reliable in performing their intended function.

While a single embodiment of the invention is herein illustrated and described, it will be understood that changes may be made in the construction and arrangement of elements without departing from the spirit or scope of the invention. Therefore, without limitation in this respect, the invention is defined by the following claims.

I claim:

1. In a filter unit of the type comprising a structure enclosing a filter bed of granular media through which liquid flows by gravity to separate solid impurities therefrom and in which the filter bed is cleaned by a fluid system for producing a back flow of liquid upwardly through the filter bed to remove the filtered solids from the granular filtering media and carrying them in suspension, the combination with such a filter unit of drain troughs extending across the filter unit above the filter bed and in spaced relation to each other, baffle elements extending between and supported on adjacent drain troughs, the adjacent baffles at opposite sides of each drain trough having sides inclined inwardly toward each other to progressively increase the velocity of the wash liquid flowing upwardly toward the drain trough therebetween to maintain the removed solids in suspension, and spacers between the baffles and edges of the troughs to permit the wash liquid to flow into the drain troughs and control its velocity whereby to insure the delivery of the removed solids into the drain trough.

2. A filter unit comprising an enclosing structure having a bottom and side walls, a filter bed of granular media supported from the bottom wall, means for delivering liquid to be filtered onto the top of the filter bed for gravity flow therethrough, means for removing the filtered liquid from the bottom of the filter bed, means for cleaning the filter bed by flowing liquid in a reverse direction through the bed to flush the filtered solid materials from the granular filtering media and place it in suspension in the flush liquid, drain troughs extending across the filter unit above the filter bed and supported by the walls of the enclosing structure, box-like baffles extending between adjacent drain troughs, spacer plates projecting from the opposite sides of each baffle and engaging the edges of adjacent drain troughs to support it thereon, and the sides of said box-like baffles diverging outwardly and upwardly from the top of the filter bed to the edges of the drain troughs to decrease the cross-sectional area and increase the velocity of the liquid flowing toward the troughs to carry the suspended solids into the troughs.

3. A filter unit comprising an enclosing structure having a bottom and side walls, a filter bed of granular media supported from the bottom wall, a plurality of drain troughs extending across the filter unit above the filter bed in spaced relation to each other, said drain troughs being supported by the walls of the enclosing structure, a plurality of hollow box-like baffle units mounted in end to end relationship in separate rows between the spaced drain troughs, each of said baffle units having sides diverging outwardly and upwardly from the filter bed to the sides of adjacent troughs, and spacer plates attached to opposite sides of each baffle element adjacent its ends and engaging the edge of a trough to support the baffle units thereon and space the inclined side walls therefrom whereby to provide a path of progressively decreasing cross-sectional area from the filter bed to the opposite edges of each trough.

4. A filter unit comprising an enclosing structure forming a filter chamber having a bottom and side walls, a filter bed of granular media supported from the bottom wall, a plurality of drain troughs extending across the filter unit above the filter bed and arranged in spaced relation to each other and side walls of the filter chamber, a plurality of box-like elements having spacer plates at each side and extending between and mounted on adjacent drain troughs in end to end relationship and between the side walls and adjacent drain troughs, a cover on each box-like element having opposite edges overlying adjacent drain troughs, said covers providing an extensive generally flat area above the filter bed onto which sediment from liquid to be filtered will settle before entering the filter bed, and the sides of adjacent rows of box-like elements being inclined to provide gradually converging paths of flow from the top of the filter bed to the drain troughs between adjacent row elements.

5. A filter unit in accordance with claim 3 in which each of the baffles comprises spaced bulkheads having inclined edges on at least one side, side walls attached to the edges of the bulkheads to form a hollow shell, said spacer plates being attached to and extending from at least one of the side walls, and openings in the bulkheads to permit liquid to flow into and out of each hollow baffle unit.

6. A filter unit in accordance with claim 5 in which the hollow baffles have removable covers at the top thereof, and a plate attached to the end of the cover for each baffle and overlying the opposite end of the cover of an adjacent baffle whereby the covers act as an auxiliary platform in the filter unit on which solids settle from the liquid being filtered before it enters the filter bed.

7. A filter unit in accordance with claim 6 in which each baffle unit has spaced clips at one end, and each of said covers having a handle to adapt them to be manually applied to and removed from a baffle.

8. A filter unit in accordance with claim 5 in which each baffle comprises stringers extending longitudinally at the sides of the bulkheads to which the side plates are attached.

9. A filter unit in accordance with claim 5 in which the bulkheads have inclined edges at each side with the inclination at each side divided in different angles of slope.

10. A filter unit in accordance with claim 5 in which the bulkheads have inclined edges at one side, vertical edges at the opposite sides, and walls attached to the edges at opposite sides.

References Cited in the file of this patent

UNITED STATES PATENTS

| | | |
|---|---|---|
| 1,406,340 | Brown | Feb. 14, 1922 |
| 2,745,553 | Riddick | May 15, 1956 |